United States Patent
Fowler et al.

(10) Patent No.: US 7,414,635 B1
(45) Date of Patent: Aug. 19, 2008

(54) OPTIMIZED PRIMITIVE FILLER

(75) Inventors: Mark C. Fowler, Hopkinton, MA (US);
Kevin M. Olson, Marlborough, MA (US)

(73) Assignee: ATI International SRL, Christchurch (BB)

( * ) Notice: Subject to any disclaimer, the term of this patent is extended or adjusted under 35 U.S.C. 154(b) by 270 days.

(21) Appl. No.: 09/629,337

(22) Filed: Aug. 1, 2000

(51) Int. Cl.
*G06T 15/30* (2006.01)
(52) U.S. Cl. ...................................... 345/620
(58) Field of Classification Search ................ 345/619, 345/620, 621, 627, 628, 622, 623, 624
See application file for complete search history.

(56) References Cited

U.S. PATENT DOCUMENTS

| | | | |
|---|---|---|---|
| 3,639,736 A * | 2/1972 | Sutherland | 708/290 |
| 4,888,712 A * | 12/1989 | Barkans et al. | 345/627 |
| 5,040,130 A * | 8/1991 | Chang et al. | 345/622 |
| 5,051,737 A * | 9/1991 | Akeley et al. | 345/622 |
| 5,079,719 A * | 1/1992 | Maillot | 345/624 |
| 5,357,599 A * | 10/1994 | Luken | 345/627 |
| 5,455,897 A * | 10/1995 | Nicholl et al. | 345/627 |
| 5,488,684 A * | 1/1996 | Gharachorloo et al. | 345/423 |
| 5,777,625 A * | 7/1998 | Rossin | 345/620 |
| 5,856,829 A * | 1/1999 | Gray et al. | 345/422 |
| 5,877,773 A * | 3/1999 | Rossin et al. | 345/621 |
| 6,005,586 A * | 12/1999 | Morita et al. | 345/624 |
| 6,052,129 A * | 4/2000 | Fowler et al. | 345/620 |
| 6,144,387 A * | 11/2000 | Liu et al. | 345/427 |
| 6,169,554 B1 * | 1/2001 | Deering | 345/764 |
| 6,268,875 B1 * | 7/2001 | Duluk et al. | 345/506 |
| 6,831,660 B1 * | 12/2004 | Kipping et al. | 345/625 |
| 2001/0013867 A1 * | 8/2001 | Watanabe et al. | 345/427 |

OTHER PUBLICATIONS

Robert H. Bishop editor, George I Cohn, The Mechatronics Handbook, 2002, CRC Press, chapter 36.*
Pineda, Juan; A Parallel Algorithm for Polygon Rasterization; Computer Graphics; vol. 22, No. 4; Aug. 1988; pp. 17-20.
Akeley, Kurt; RealityEngine Graphics; Silicon Graphics Computer Systems; Computer Graphics Proceedings; Annual Conference Series; 1993; pp. 109-116.
Van Hook, Timothy J. et al.; Method and Apparatus for Graphics Rasterization; patent application filed Dec. 28, 1999.

* cited by examiner

*Primary Examiner*—Jeffery A. Brier
(74) *Attorney, Agent, or Firm*—Vedder Price P.C.

(57) ABSTRACT

The optimized primitive filler is used in a computer system, such as a computer system that displays graphic images. A first step of the method it is determined if a primitive is totally outside a predetermined screen region or at least partially within the predetermined screen region. The primitive is then discarded if the primitive is totally outside the screen region. If the primitive is not totally outside the screen region, at least a portion of the primitive is identified that lies within the screen region. Then only those pixels in the portion of the primitive that is inside the screen region are filled. These steps are executed for each primitive of a plurality of primitives that forms a scene of which the screen region is the portion that the computer system displays. No pixels are filled in primitives which are totally outside the screen region, and no pixels are filled in portions of primitives that are outside the screen region. The optimized primitive filler and its associated method provide a fast and efficient rasterization of primitives.

10 Claims, 5 Drawing Sheets

OPTIMIZED PRIMITIVE FILLER

FIELD OF THE INVENTION

The present invention relates to the field of processing graphic images, and, in particular, to graphics rasterization.

BACKGROUND OF THE INVENTION

In the field of computer graphics, the graphics rendering pipeline is the core of real time graphics. The function of the pipeline is to generate, or render, two dimensional images, three dimensional objects, light sources, lighting models, textures and more. The locations and shapes of the objects in the scene are determined by the geometry, placement of the camera in the environment and the characteristics of that environment. The appearance of the objects is affected by material properties, light sources, textures and lighting models.

The process of rasterizing in computer graphics defines a particular scene in terms of primitives, which are typically triangles. For a particular scene, the area to be displayed by a computer system is termed a screen region. The screen region usually is an area that is less than the total scene. Therefore, some of the primitives lie outside of the screen region, while others lie either partially in the screen region or completely within the screen region. During rasterization the primitives are processed such that pixels contained within the primitives are given values in terms of their color, textures, transparency, etc.

Initially during rasterization, the primitives are filled with a solid color or pattern. The function of filling primitives can be broken into two parts. First a decision must be made as to which pixels to "fill" (assign values) within a primitive, and also as to what values to assign to these pixels. If the pixels are to be assigned a solid color, for example, then primitives which lie entirely within the screen region have each of their pixels assigned the color value. However, if a primitive lies only partially within the screen area, to assign all the pixels a particular value and then to discard the portion of the primitive lying outside of the screen area requires large amounts of computer processing time and is inefficient.

The process of clipping is the process of determining the portion of a primitive that is within a clipping region, such as the screen region. By clipping the rectangle to the screen region drawing time is saved during the rasterization. Scissoring is the process of computing all points of the primitive, and then drawing only those lines within in the rasterized clip region. Although a number of algorithms are set forth in the prior art with regards to scissoring and clipping, increasing complexity of graphic images has required more efficient methods of clipping or scissoring primitives with regards to the screen region.

Therefore, there is a need in the prior art to provide a more efficient method and apparatus for culling pixels of a primitive that are not in a scissors region. A drawback of the prior art is an implementation of scissoring primitives which fills all the primitives with pixels and then for every pixel has hardware check x,y pixel coordinates against the scissor planes and cull each pixel individually if it is outside the scissor plane. This prior art method is very inefficient in terms of performance as it requires hardware to completely fill all primitives, even for pixels that are outside the scissor plane. Another prior art method is to perform clipping at intersections of primitive edges with the scissor plane. New primitives are then created by subdividing the original primitives in an interactive manner until there are no primitives to intersect the scissor plane. This prior art method of clipping is slow and costly in terms of hardware implementations.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, and the several figures of which like reference numerals identify like elements.

DETAILED DESCRIPTION OF A PREFERRED EMBODIMENT OF THE INVENTION

The present invention is used in a computer system, such as a computer system that displays graphic images. The method of the present invention is, in particular, for rasterizing primitives. A first step of the inventive method is to determine if a primitive is totally outside a predetermined screen region. The primitive is discarded if the primitive is totally outside the screen region. If the primitive is not totally outside the screen region, at least a portion of the primitive is identified that lies within the screen region. Then only those pixels in the portion of the primitive that is inside the screen region are filled. These steps are then executed for each primitive of the plurality of primitives that forms the scene of which the screen region is the portion that the computer system displays.

In general terms, a start point is defined at a vertex of a triangular primitive. It is then determined if the start point is outside the screen region. The edge of the primitive is then edge walked from the start point to a boundary of the screen region. A portion of the primitive inside the screen region is span walked and each pixel in the portion of the primitive that is inside the screen region is filled. In a typical graphic system, the primitive is a triangle and the start point is a vertex of the triangle. Edge walkers and span walkers are known in the art, for example.

Figure 1:
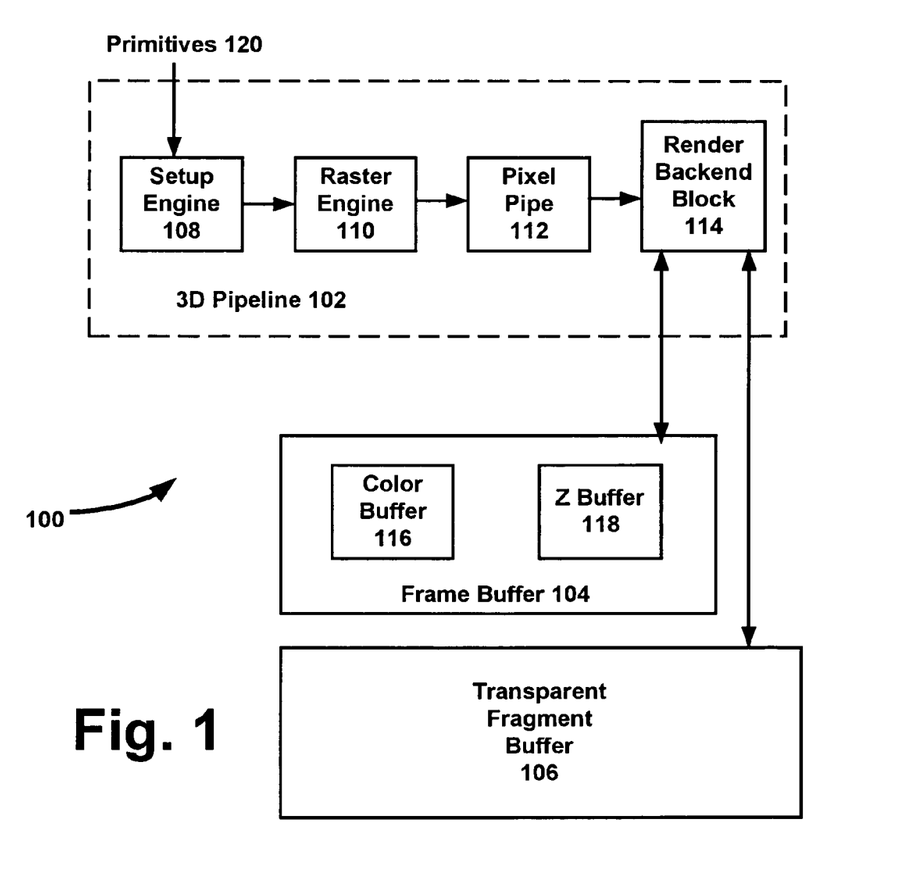
FIG. 1 depicts a 3D pipeline on a graphics chip according to the present invention.

FIG. 1 is a block diagram of a graphics chip 100 operatively connected to a frame buffer 104 and receiving a command stream. In particular, the command stream is received by a graphic processor from other stages in the computer equipment, which are not shown. The command stream contains the information for forming an image on a display. The graphics processor processes the information as known in the art to provide primitives 120 that are representative of the desired image. The primitives 120 are received by a set up engine 108 in a 3D pipeline 102. In the set up engine 108, the x,y coordinates of the primitives 120 are transformed to form screen coordinates. The screen coordinates together with the z coordinate are also referred to as window coordinates. The primitives are then mapped in this window and have x,y coordinates and z coordinates which indicate which primitives are in front of which primitives. These primitives are then passed on to the raster engine 110. The raster engine 110 is also referred to as a scan converter which converts the two dimensional vertices in screen space with at least a z value, a color, and a texture coordinate associated with each vertex into pixels. Unlike previous stages that performed polygon operations, the raster engine stage handles pixel operations. Pixel pipe 112 is operatively connected to the raster engine 110 and a render backend block 114 is operatively connected to the pixel pipe 112. A frame buffer 104, which is connected to the render backend block 114, has at least a color buffer 116 and a z buffer 118. The color buffer 116 stores color information corresponding to pixels in the display frame, and the z buffer 118 stores corresponding z values for the pixels in the display frame.

Figure 2:
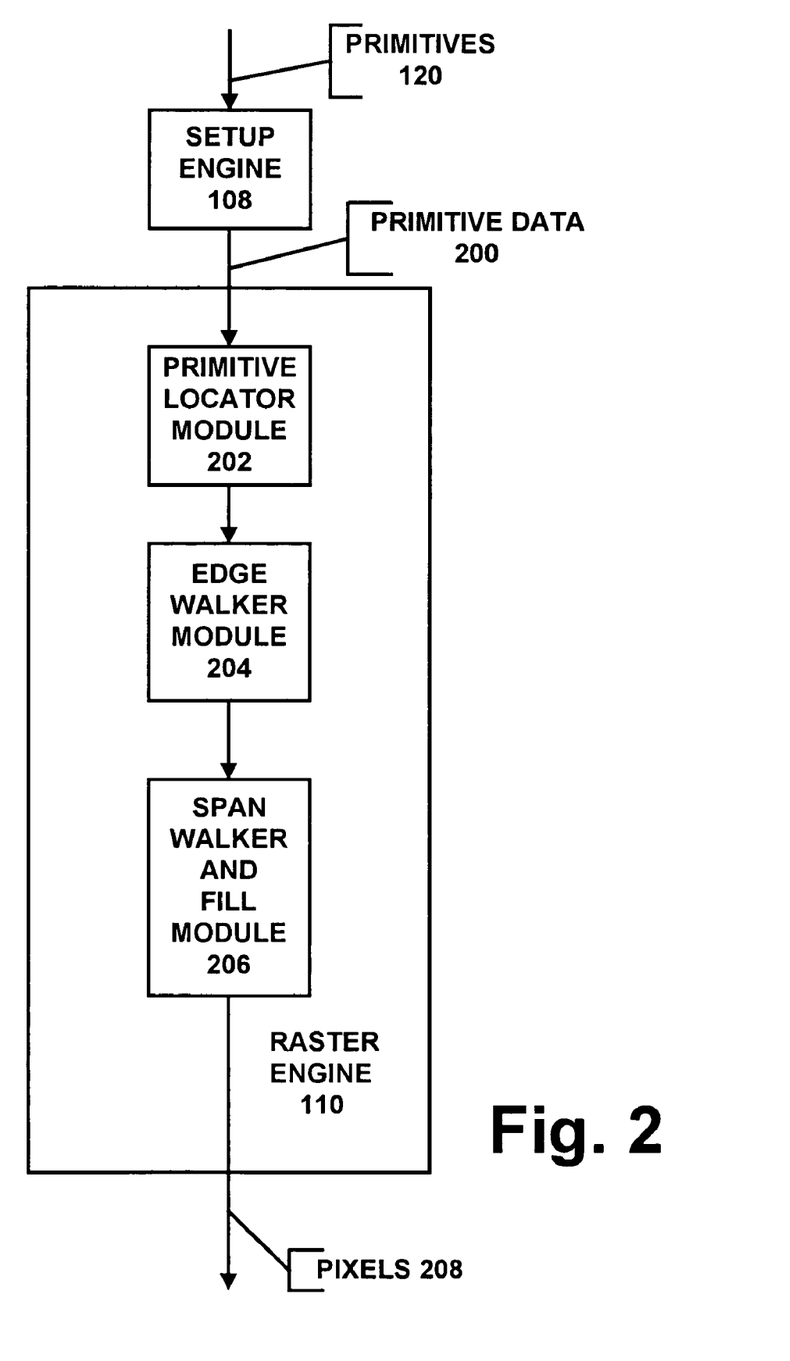
FIG. 2 is a more detailed block diagram of the raster engine in FIG. 1.

FIG. 2 shows a block diagram of a graphic primitive clipping system according to the present invention which consists of the set up engine 108 and the raster engine 110. The set up engine 108 receives the primitives 120 and outputs the primitive data 200. The raster engine 110 receives the primitive data 200 in a primitive locator module 202. The primitive locator module 202 supplies at least location values only of primitives that are at least partially within the screen region. These location values are received by the edge walker module 204, which processes the information and supplies data identifying the portion of the primitive that is inside of the screen region. It should be understood that the primitive locator module 202 identifies primitives which are partially within the screen region and primitives which are completely within the screen region. The edge walker 204 is operatively coupled to the span walker and fill module 206. The span walker and fill module functions to fill, that is, to assign a color value, for example, to each pixel in the portion of the primitive that is within the screen region. Of course, it also assigns values to each of the pixels of a primitive which is totally within the screen region. Raster engine 110 then outputs the pixels 208 for further processing by the 3D pipeline 102.

The present invention does not fill primitives or any portion of primitives that are outside the screen region nor does it implement any hardware or require any hardware to calculate an intersection of primitives with the screen region. Instead, the present invention incorporates the screen region into the edge walking routine, that is, the edge walking module will only start filling the primitive when it is inside the screen region (image region). According to the present invention, if the edge walker starts at a vertex of the primitive outside the screen region, it then travels to the nearest point of primitive intersection with the screen region. The present invention will also terminate filling of a primitive when it transitions from inside of the screen region to outside the screen region.

Figure 3:
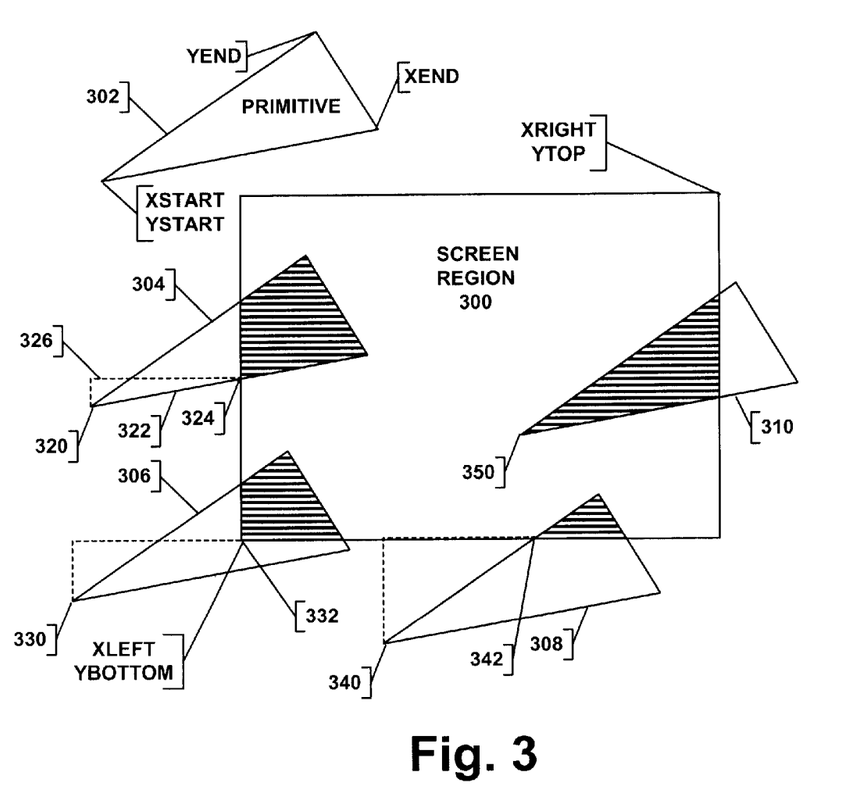
FIG. 3 depicts the location of various primitives relative to a screen region.

Depicted, for example, in FIG. 3, is a screen region 300 and a plurality of primitives 302-310. As depicted in FIG. 3, primitive 302 is totally outside of the screen region 300, while the remaining primitives 304-310 are partially within the screen region 300. Each of the primitives 304-310 have different orientations relative to the screen region 300. For example, primitive 304 has its right hand portion within the screen region 300, while primitive 310 has its left hand portion within the screen region 300. The primitive 306 overlaps a corner of the screen region 300, and primitive 308 has its upper portion within the screen region 300.

The screen region 300 is defined by a coordinate system, wherein the bottom left corner of the screen region 300 is denoted as XLEFT, YBOTTOM, and has an upper right hand corner denoted by XRIGHT, YTOP. In this coordinate system, the x direction runs from left to right across the screen region 300, and the y direction runs from bottom to top across the screen region 300. Each of the primitives can be defined relative to the coordinate system and in the present invention, each primitive, such as primitive 302, is defined by a vertex XSTART, YSTART, and a value XEND which is the furthest x direction extent and a value YEND which is the furthest y direction extent from the starting value vertex XSTART, YSTART.

Figure 4:
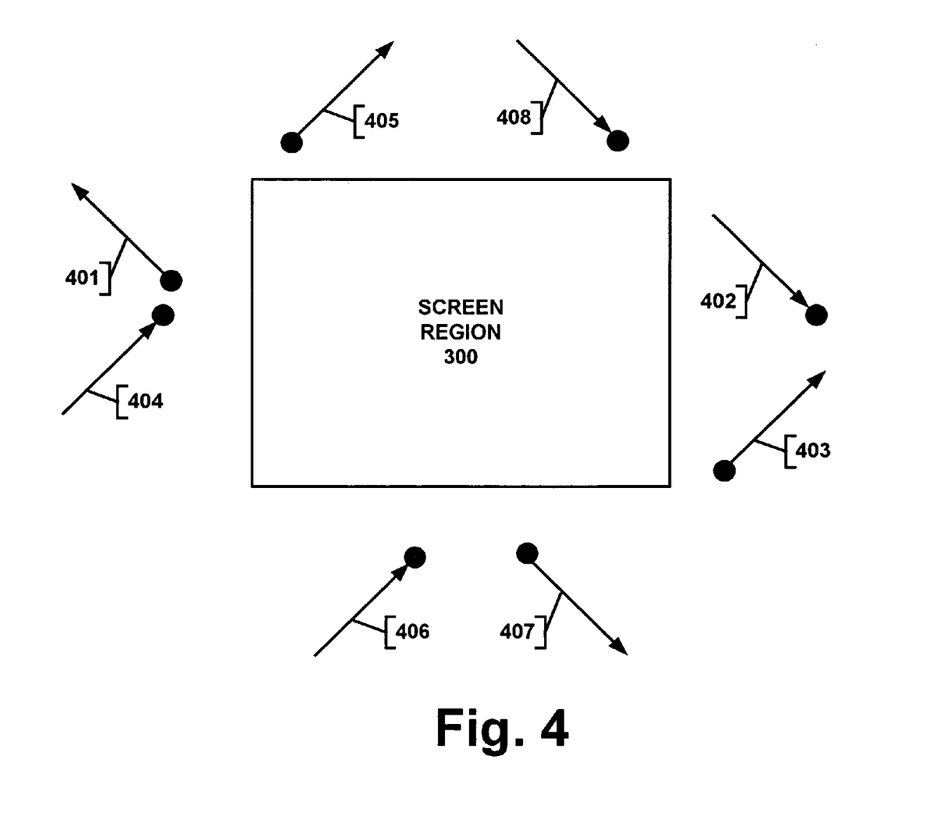
FIG. 4 schematically depicts directional values for primitives relative to the screen region.

Directional values used by the present invention are depicted in FIG. 4. In FIG. 4 the screen region 300 is shown surrounded by directional symbols. The present invention assigns values to x and y directions of 1 and 0 as follows. An x direction value of 1 indicates right to left, while an x direction value of 0 indicates left to right. A y direction value of 1 indicates bottom to top while a y direction value of 0 indicates top to bottom. FIGS. 3 and 4 will be utilized in explaining the method of the present invention which is depicted in the flow chart of FIG. 5. In a first step 500 of the method of the present invention, a screen region 300 is defined by the screen values XLEFT, XRIGHT, YTOP, YBOTTOM. A primitive to be processed is then defined by XSTART, XEND, YSTART, YEND as shown in FIG. 3 in step 502. For the primitive the values XSTART and XEND define an x direction extent and location of the primitive in the coordinate system. Similarly, the values YSTART and YEND define a y direction extent and location of the primitive in the coordinate system. For the screen region 300, the values XLEFT and XRIGHT define an x direction extent and location of the screen region in the coordinate system, while YTOP and YBOTTOM define a y direction extent and location for the screen region in the coordinate system. In step 503 the variables x and y for the primitive are initially set to the XSTART, YSTART values.

In step 504 it is determined if the primitive is totally outside of the screen region 300, such as a primitive 302 in FIG. 3. The primitive 302 will be found to be totally outside the screen region 300 if at least one of the following is logically true given a start point of x=XSTART and y=YSTART for the primitive:

XDIR AND ((X<XLEFT) OR (XEND>XRIGHT))
$\overline{\text{XDIR}}$ AND ((X>XRIGHT) OR (XEND>XLEFT))
YDIR AND ((Y<YTOP) OR (YEND>YBOTTOM))
$\overline{\text{YDIR}}$ AND ((Y>YBOTTOM) OR (YEND<YTOP))

Figure 5:
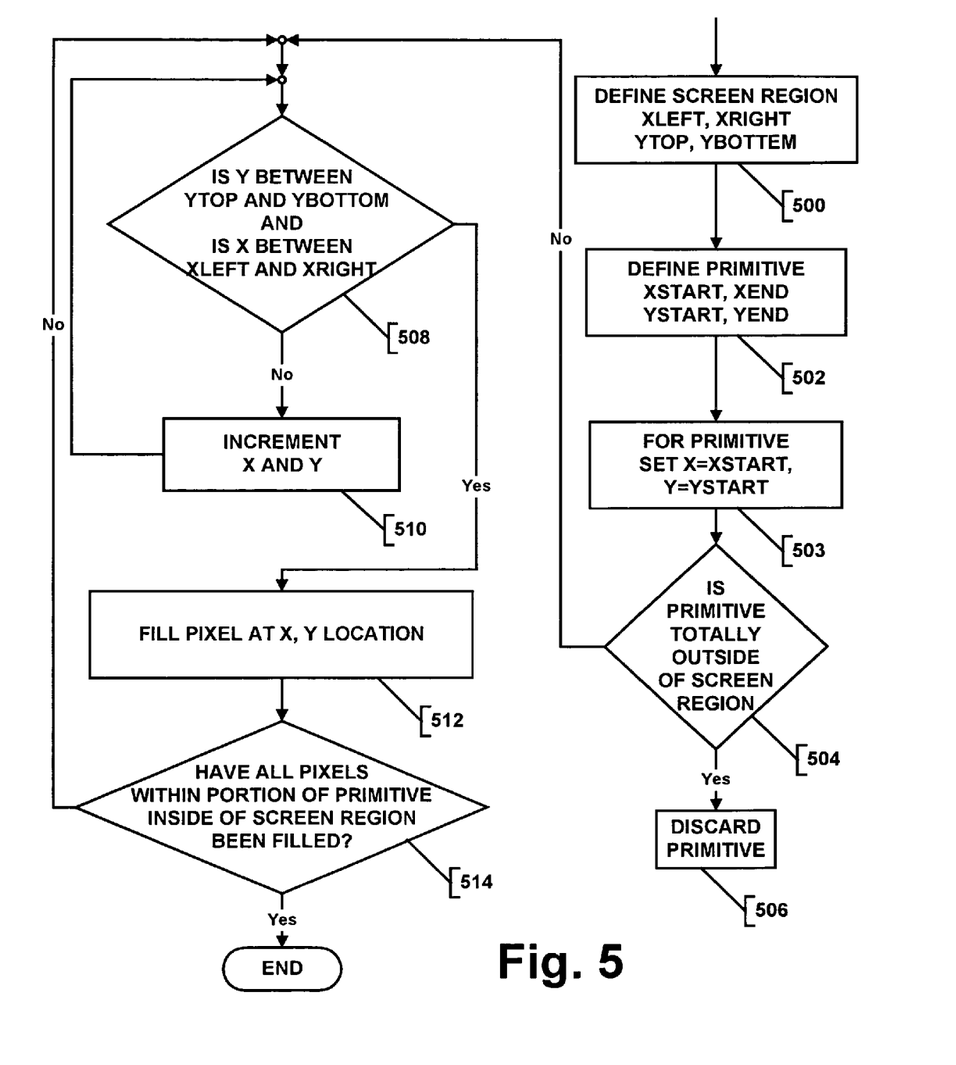
FIG. 5 is a flow chart of a method of the present invention.

If the primitive is found to be totally outside of the screen region, such as primitive 302 in FIG. 3, the primitive is then discarded without filling any pixels therein in step 506 of the method depicted in FIG. 5. If the primitive is not totally outside of the screen region 300, then it must be determined what portion of the primitive lies within the screen area 300.

The portion of the primitive lying within the screen area 300 is identified as follows. First, the variable y is incremented if the following first value is logically true:

(((YDIR AND (Y>YBOTTOM)) OR (($\overline{\text{YDIR}}$ AND (Y<YTOP)))

Then the variable x is incremented if the following second value is logically true:

(((XDIR AND X>XRIGHT)) OR (($\overline{\text{XDIR}}$ AND (X<XLEFT))).

These steps (508, 510) are then repeated until the first and second values are not true, which identifies a beginning of a portion of the primitive that is inside the screen region. That is, the test is to determine if the variable y is between YTOP and YBOTTOM, and if the variable x is between XLEFT and XRIGHT. If the answer to this question is no, then x and y are incremented. If the answer to the question is yes, then the pixel corresponding to that x,y coordinate lies within the portion of the primitive within the screen region 300, and the pixel is then filled (step 512), that is, assigned the proper color value. The process ends when all pixels within the portion of the primitive inside the screen region 300 have been filled, the test being performed in step 514 in FIG. 5.

It is to be noted that in general the method steps and the equations involve comparisons of the current x and y coordinates to the XLEFT, XRIGHT and YTOP and YBOTTOM of the screen area, as well as the X direction and Y direction values at that x,y coordinate. Note that when x and y are incremented, there are eight possible directions of movement as depicted in FIG. 4. For example, the direction 401 has an X direction from right to left and is assigned a value of 1, and a Y direction from bottom to top which has an assigned value of 1. The direction symbol 402 has an X direction of left to right and therefore has an assigned value of 0 and a Y direction of top to bottom which has an assigned value of 0. Direction symbol 403 would have an X direction value of 0 and a Y direction value of 1. The direction symbol 404 has an X direction value of 0 and a Y direction value of 1. The direction symbol 405 has an X direction value of 0 and a Y direction value of 1. The direction symbol 406 has an X direction value of 0 and a Y direction value of 1. The direction value symbol 407 has an X direction value of 0 and a Y direction value of 0. The direction symbol 408 has an X direction value of 0 and a Y direction value of 0.

The primitive location module 202 in one embodiment is software that implements the step of determining if the primitive is totally outside the screen region. Similarly, the edge walker module 204 and the span walker module 206 are software implementations for performing the above described steps.

When the edge walker 204 in the raster engine 110 begins at the XSTART, Y START values of a primitive, it walks one of the edges of the primitive until it reaches the closest boundary point of intersection of the primitive with the screen region. For example, as shown in FIG. 3, the edge walker would begin in primitive 304 at the vertex 320 and proceed along edge 322 until it reaches the point of intersection 324. The dotted line 326 schematically depicts how the edge walker proceeds in the X direction and in the Y direction until it arrives at the intersection point 324. In reality, it is to be understood that the actual movement is a stair step-type movement along the edge 322.

For primitive 306, the edge walker starts at vertex 330 and proceeds until it identifies point 332 as being the first point of intersection between the primitive 306 and the screen region 300. It is to be understood that once the area within the screen region 300 is identified, the span walker and fill module 206 then take over and fill each of the pixels and the portion of the primitive which is within the screen region 300. This is indicated by the area of the primitives which are filled with lines in FIG. 3. Primitive 308 shows that the edge walker would start at the vertex 340 and proceed to the intersection point 342 at which time the span walker fill module would take over to fill a portion of the primitive 308 which is within the screen region 300. Finally, it is shown how the method of the present invention also works for primitive 310 wherein the start point 350 is within the screen region 300. The equations then cause the span walker and fill module 206 to fill the portion of the primitive 310 which is within the screen region 300 but not the portion of the primitive 310 which is outside of the screen region 300.

Thus, in general, in the primitive location module 202 the primitive values are compared to the screen region values to determine if the primitive is totally outside the screen region. If this is not true, then the edge walker module 204 and the span walker and fill module 206 determine the start point of the intersection of the primitive in the screen region for filling the pixels that are within this portion. The filling of the pixels within the portion within the screen region is finished when one of the following is true:

(XDIR AND (X<XLEFT)),
($\overline{\text{XDIR}}$ AND (X>XRIGHT)),
(YDIR AND (Y<YTOP)),
($\overline{\text{YDIR}}$ AND (Y>YBOTTOM))

Thus, the invention fulfills the need in the prior art for an efficient method of filling the portions of primitives lying within a screen region. The method of the present invention in particular does not fill the portions of the primitives outside of the screen region, thus saving significant computing time and resources. Furthermore, the method of the present invention does not require a hardware calculation of the intersection of the primitives with the screen region as is done in the prior art.

The invention is not limited to particular details of the apparatus and method depicted and the modifications and applications may be contemplated. Certain other changes may be made in the above-described method and apparatus without departing from the true spirit of the scope of the invention herein involved. For example, the method of the present invention can be utilized in other computer systems other than the 3D pipeline embodiment depicted in FIG. 1. Furthermore, the primitives can have other configurations than triangular, and the starting point can occur at other locations on the primitive rather than the vertex of a triangle. It is intended, therefore, that the subject matter in the above depiction should be interpreted as illustrative and not in a limiting sense.

What is claimed is:

1. A graphic primitive clipping system that clips triangular primitives relative to a predetermined screen region, each primitive defined by location values XSTART, YSTART, XEND, and YEND;

XSTART and XEND defining an X direction extent and location of the primitive in the coordinate system, and YTOP and YBOTTOM defining a Y direction extent and location of the primitive in the coordinate system, a screen region defined by limit values XLEFT, XRIGHT, YTOP, and YBOTTOM;

XLEFT and XRIGHT defining an X direction extent and location of the screen region in the coordinate system, and YTOP and YBOTTOM defining a Y direction extent and location of the screen region in the coordinate system, the primitive further defined by first and second x direction values of 0 and 1, respectively, for an x direction XDIR in the coordinate system as, respectively, left to right and right to left relative to the screen region, and first and second y direction values as 0 and 1, respectively, for a y direction YDIR in the coordinate system as, respectively, top to bottom and bottom to top, comprising:

a primitive locator module having an input for receiving primitives and having an output for supplying only primitives that are at least partially within the screen region, primitives being totally outside the screen area if at least one of the following is logically true given a start point X=XSTART and Y=YSTART for a primitive:

XDIR AND ((X<XLEFT) OR (XEND>XRIGHT))
$\overline{\text{XDIR}}$ AND ((X>XRIGHT) OR (XEND>XLEFT))
YDIR AND ((Y<YTOP) OR (YEND>YBOTTOM))
$\overline{\text{YDIR}}$ AND ((Y>YBOTTOM) OR (YEND<YTOP));

an edge walker module having an input operatively connected to the output of the primitive locator module and having an output for supplying data identifying the portion of the primitive inside of the screen region, the edge walker module structured such that at least a portion of the primitive that is inside the screen region, given a start point X=XSTART and Y=YSTART for the primitive, being found by:

(1) incrementing Y if a first value, (((YDIR AND (Y>YBOTTOM)) OR (($\overline{\text{YDIR}}$ AND (Y<YTOP))), is logically true;
(2) incrementing X if a second value, (((XDIR AND (X>XRIGHT)) OR (($\overline{\text{XDIR}}$ AND (X<XLEFT))), is logically true; and
(3) repeating (1) and (2) until the first and second values are not true, which identifies a beginning of a portion of the primitive that is inside of the screen region; and
a span walker having an input operatively connected to the output of the edge walker and an output for supplying filled pixels for pixels in the portion of the primitive inside of the screen region, the span walker having filled all pixels in the portion of the primitive inside of the screen region when one of the following is true:
(XDIR AND (X<XLEFT)),
($\overline{\text{XDIR}}$ AND (X>XRIGHT)),
(YDIR AND (Y<YTOP)),
($\overline{\text{YDIR}}$ AND (Y>YBOTTOM)).

2. The system according to claim 1, wherein the start point is a vertex of the primitive.

3. In a computer system, a method for rasterizing primitives, comprising:
determining if a primitive is totally outside a predetermined screen region or at least partially within the predetermined screen region;
discarding the primitive if the primitive is totally outside the screen region;
finding a portion of the primitive that is inside the screen region if the primitive is not totally outside the screen region;
filling only pixels in the portion of the primitive that is inside the screen region;
wherein determining if the primitive is inside or outside of the screen region, comprises:
providing an X, Y coordinate system;
determining values of XSTART, YSTART, XEND, and YEND for the primitive, XSTART and XEND defining an X direction extent and location of the primitive in the coordinate system, and YSTART and YEND defining a Y direction extent and location of the primitive in the coordinate system;
providing values of XLEFT, XRIGHT, YTOP, and YBOTTOM for the screen region, XLEFT and XRIGHT defining an X direction extent and location of the screen region in the coordinate system, and YTOP and YBOTTOM defining a Y direction extent and location of the screen region in the coordinate system;
comparing the primitive values to the screen region values to determine if the primitive is totally outside the screen region;
defining first and second x direction values of 0 and 1, respectively, for an x direction XDIR in the coordinate system as, respectively, left to right and right to left relative to the screen region, and defining first and second y direction values as 0 and 1, respectively, for a y direction YDIR in the coordinate system as, respectively, top to bottom and bottom to top; and
determining that the primitive is totally outside the screen area if at least one of the following is logically true given a start point X=XSTART and Y=YSTART for the primitive:
XDIR AND ((X<XLEFT) OR (XEND>XRIGHT))
$\overline{\text{XDIR}}$ AND ((X>XRIGHT) OR (XEND>XLEFT))
YDIR AND ((Y<YTOP) OR (YEND>YBOTTOM))
$\overline{\text{YDIR}}$ AND ((Y>YBOTTOM) OR (YEND<YTOP));
and
wherein the filling is finished when one of the following is true:
(XDIR AND (X<XLEFT)),
($\overline{\text{XDIR}}$ AND (X>XRIGHT)),
(YDIR AND (Y<YTOP)),
($\overline{\text{YDIR}}$ AND (Y>YBOTTOM)).

4. The method according to claim 3, wherein in finding at least a portion of the primitive that is inside the primitive, given a start point X=XSTART and Y=YSTART for the primitive, the method further comprises:
(1) incrementing Y if a first value, (((YDIR AND (Y>YBOTTOM)) OR (($\overline{\text{YDIR}}$ AND (Y<YTOP))), is logically true;
(2) incrementing X if a second value, (((XDIR AND (X>XRIGHT)) OR (($\overline{\text{XDIR}}$ AND (X<XLEFT))), is logically true; and
(3) repeating (1) and (2) until the first and second values are not true, which identifies a beginning of a portion of the primitive that is inside of the screen region.

5. The method according to claim 3, wherein the primitive is a triangle.

6. A graphic primitive clipping system that receives primitives and clips the primitives relative to a predetermined screen region, comprising:
a setup engine having an input for receiving a primitive and an output for supplying at least location values of the primitive relative to the screen region;
a primitive locator module having an input operatively connected to the output of the setup engine and having an output for supplying the at least location values only of primitives that are partially within the screen region;
an edge walker module having an input operatively connected to the output of the primitive locator module and having an output for supplying data identifying the portion of the primitive inside of the screen region;
a span walker having an input operatively connected to the output of the edge walker and an output for supplying filled pixels for pixels in the portion of the primitive inside of the screen region;
wherein the primitive locator module compares the location values of the primitive to starting and ending values of the screen region values to determine if the primitive is totally outside the screen region;
wherein the primitive and the screen region lie in an X,Y coordinate system, wherein the location values of the primitive are XSTART, YSTART, XEND, and YEND;
XSTART and XEND defining an X direction extent and location of the primitive in the coordinate system, and YSTART and YEND defining a Y direction extent and location of the primitive in the coordinate system, and wherein the screen region has limit values of XLEFT, XRIGHT, YTOP, and YBOTTOM;
XLEFT and XRIGHT defining an X direction extent and location of the screen region in the coordinate system, and YTOP and YBOTTOM defining a Y direction extent and location of the screen region in the coordinate system, wherein the primitive further is defined by first and second x direction values of 0 and 1, respectively, for an x direction XDIR in the coordinate system as, respectively, left to right and right to left relative to the screen region, and first and second y direction values as 0 and 1, respectively, for a y direction YDIR in the coordinate system as, respectively, top to bottom and bottom to top, and wherein the primitive is totally outside the screen area if at least one of the following is logically true given a start point X=XSTART and Y=YSTART for the primitive:

XDIR AND ((X<XLEFT) OR (XEND>XRIGHT))
$\overline{\text{XDIR}}$ AND ((X>XRIGHT) OR (XEND>XLEFT))
YDIR AND ((Y<YTOP) OR (YEND>YBOTTOM))
$\overline{\text{YDIR}}$ AND ((Y>YBOTTOM) OR (YEND<YTOP)).

7. The system according to claim 6, wherein the system processes each primitive of a plurality of primitives.

8. The method according to claim 6, wherein the edge walker module finds at least a portion of the primitive that is inside the primitive, given a start point X=XSTART and Y=YSTART for the primitive, by:

(1) incrementing Y if a first value, (((YDIR AND (Y>YBOTTOM)) OR (($\overline{\text{YDIR}}$ AND (Y<YTOP))), is logically true;

(2) incrementing X if a second value, (((XDIR AND (X>XRIGHT)) OR (($\overline{\text{XDIR}}$ AND (X<XLEFT))), is logically true; and (3) repeating (1) and (2) until the first and second values are not true, which identifies a beginning of a portion of the primitive that is inside of the screen region.

9. The system according to claim 6, wherein the span walker has filled all pixels in the portion of the primitive inside of the screen region when one of the following is true:

(XDIR AND (X<XLEFT)),
($\overline{\text{XDIR}}$ AND (X>XRIGHT)),
(YDIR AND (Y<YTOP)),
($\overline{\text{YDIR}}$ AND (Y>YBOTTOM)).

10. The method according to claim 6, wherein the primitive is a triangle.

* * * * *